United States Patent
Iihoshi et al.

(10) Patent No.: US 7,489,997 B2
(45) Date of Patent: Feb. 10, 2009

(54) DIAGNOSTIC APPARATUS FOR INTERNAL COMBUSTION ENGINE

(75) Inventors: Yoichi Iihoshi, Tsuchiura (JP); Shin Yamauchi, Mito (JP); Toshio Hori, Hitachinaka (JP); Yoshikuni Kurashima, Mito (JP)

(73) Assignee: Hitachi, Ltd., Tokyo (JP)

( * ) Notice: Subject to any disclaimer, the term of this patent is extended or adjusted under 35 U.S.C. 154(b) by 96 days.

(21) Appl. No.: 11/744,348

(22) Filed: May 4, 2007

(65) Prior Publication Data
US 2008/0086257 A1 Apr. 10, 2008

(30) Foreign Application Priority Data
May 12, 2006 (JP) ............................. 2006-134371

(51) Int. Cl.
*G06F 19/00* (2006.01)
*G06F 11/30* (2006.01)
*G01L 3/26* (2006.01)
*G01M 15/00* (2006.01)
*F02D 41/04* (2006.01)

(52) U.S. Cl. ................. 701/103; 701/104; 701/114; 702/183; 73/114.52

(58) Field of Classification Search ......... 701/101–105, 701/108–111, 114, 115; 123/478, 480, 486; 73/114.52, 114.53; 702/182–185; 340/438, 340/439
See application file for complete search history.

(56) References Cited

U.S. PATENT DOCUMENTS

| 4,448,162 | A | * | 5/1984 | Ninomiya et al. | 123/436 |
| 4,503,829 | A | * | 3/1985 | Hasegawa et al. | 123/492 |
| 6,985,804 | B2 | * | 1/2006 | Minami | 340/439 |
| 7,355,292 | B2 | * | 4/2008 | Yamashita | 290/40 C |
| 2002/0087238 | A1 | | 7/2002 | Matsui | |
| 2005/0209771 | A1 | * | 9/2005 | Ishiguro | 340/439 |

FOREIGN PATENT DOCUMENTS

| JP | 2002-202003 A | 7/2002 |
| JP | 2003-302276 A | 10/2003 |
| JP | 2003-328845 A | 11/2003 |

* cited by examiner

Primary Examiner—Willis R Wolfe, Jr.
(74) Attorney, Agent, or Firm—Crowell & Moring LLP

(57) ABSTRACT

A diagnostic apparatus for an internal combustion engine, comprising an adjusting device for adjusting a burning condition, a correction device for estimating or detecting an input or an output to and from the internal combustion engine so as to correct at least one of a throttle opening degree, a fuel injection pulse width, a fuel injection timing, an ignition timing and an exhaust gas recirculation quantity, a recording device for recoding a controlled correction value from the correction device at every predetermined time, and a fuel consumption evaluation means for evaluating a fuel consumption of the engine, being based upon the recorded data or log data as to the recorded data, wherein a deterioration of fuel consumption caused by an abnormality of the engine can been soon detected with no affection by an operating condition of the engine and unevenness of component parts.

13 Claims, 11 Drawing Sheets

IGNITION RETARD VALUE

INDEX f OF DETERIORATION OF FUEL CONSUMPTION

ENGINE ABNORMALITY FLAG

DIAGNOSTIC APPARATUS FOR INTERNAL COMBUSTION ENGINE

INCORPORATION BY REFERENCE

The present application claims priority from Japanese application JP2006-134371 filed on May 12, 2006, the content of which is hereby incorporated by reference into this application.

BACKGROUND OF THE INVENTION

1. Field of the Invention

The present invention relates to a diagnostic apparatus for an internal combustion engine, and in particular to a diagnostic apparatus for a diagnostic apparatus for an internal combustion engine to detect a deterioration of fuel consumption caused by an abnormality of an engine.

2. Related Art

There have been proposed the following measures: an apparatus for evaluating a fuel efficient operation, comprising a vehicle data detecting portion for detecting vehicle data as to a fuel efficient operation evaluating item of a vehicle internal combustion engine, a recording portion for recording the vehicle data, an evaluating portion for evaluating the recorded vehicle data in view of the fuel efficient operation and setting evaluation scores thereto, and a synthesizing portion for synthesizing the evaluation points so as to obtain synthetic sores, wherein the recording portion, the evaluating portion and the synthesizing portion are respectively composed of a first to an N-th recording portions, evaluating portions and synthesizing portions which correspond to a first to an N-th running conditions, and there is also provided a correction factor providing portion for calculating fuel consumption rates from fuel consumption values in the first to N-th respective running conditions so as to prepare them as correction factors and a correction synthesizing portion for correcting synthetic scores respectively obtained by the first to N-th synthesizing portions with the correction factors so as to obtain final synthetic scores (as disclosed in JP-A-2003-328845); a fuel data displaying apparatus for displaying an information for informing the driver of a fuel consumption state, wherein a total correction value which is obtained by increasing and a decreasing a fuel injection quantity by a correction factor which is set independent from a manipulation of an accelerator or a brake by the driver during a period from an reference time after a start of an engine to the present time, is averaged by a number or injection cycles in the period, and an information to be displayed for the driver is computed from a value which is obtained by adding the thus obtained averaged value to a fuel injection quantity in accordance with an operating condition of the engine before the correction by the factor in order to display an instantaneous fuel consumption to the driver with no misunderstanding (as disclosed in JP-A-2003-302276), and a method for detecting an abnormality of an internal combustion engine with the use of a learning value (as disclosed in JP-A-2002-202003)

The fuel consumption of the internal combustion engine varies normally within a range about 10 to 20%, depending upon several operating conditions, and accordingly, the conventional technology for directly computing a fuel consumption has been hardly able to detect soon an abnormality of the internal combustion engine which causes a deterioration of fuel consumption even though the driver can be informed of a fuel consumption in order to urge the driver to drive a vehicle in a fuel efficient manner.

The learning value with which an abnormally of an engine is diagnosed is inherently adapted to absorb unevenness as to component parts of an internal combustion engine, and accordingly, due to such unevenness of the component parts, the conventional technology has also been hardly able to detect soon a deterioration of fuel consumption.

SUMMARY OF THE INVENTION

The present invention is devised in view of the above-mentioned problems inherent to the conventional technology, and accordingly, an object of the present invention is to provide a diagnostic apparatus for an internal combustion engine, which can soon detect a deterioration of fuel consumption caused by an abnormality of the internal combustion engine in order to prevent a vehicle from running with inferior fuel consumption, without being affected by an operating condition and unevenness of component parts.

Further, another object of the present invention is to provide a diagnostic apparatus for an internal combustion engine, with which maintenance of a vehicle can be carried out with appropriate timing, by means of forecasting of a deterioration of fuel consumption (detection of a sign of abnormality) or external notification of a result of diagnosis from a vehicle so as to prevent occurrence of a failure.

To the end, according to the present invention, there is provided a diagnostic apparatus for an internal combustion engine, comprising an adjusting device for adjusting a fuel burning condition, a correction device for estimating or detecting an input or an output to and from the internal combustion engine so as to correct at least one of a throttle opening degree, a fuel injection pulse width, a fuel injection timing, an ignition timing and an exhaust recirculation quantity, the diagnostic apparatus for us further comprising a recording device for recording a controlled correction value from the correction device at every predetermined time, and an evaluation means for evaluating a fuel consumption of the internal combustion engine, being based upon recording data recorded in the recording device or log data as to recording data.

In the diagnostic apparatus for an internal combustion engine according to the present invention, the recording device preferably records therein at least one of controlled correction values which are relevant to the fuel consumption, such as a retard value of ignition timing, an increment quantity of fuel, a correction factor for an air-fuel ratio and an opening degree of an exhaust recirculation valve and the like.

The diagnostic apparatus according to the present invention preferably further comprises an abnormality diagnosing means for determining an abnormality of the internal combustion engine, being based upon a fuel consumption of the internal combustion engine which has been evaluated by the fuel consumption evaluation means.

In the diagnostic apparatus according to the present invention, the fuel consumption evaluating means is preferably adapted to extract a cause of deterioration of fuel consumption from the above-mentioned controlled correction value, and to calculate a index of deterioration of fuel consumption from the extracted cause of deterioration of fuel consumption, and the abnormality diagnosing means determines an abnormality of the internal combustion engine when the index of deterioration of fuel consumption exceeds a predetermined diagnostic threshold value.

The diagnostic apparatus for an internal combustion engine, according to the present invention, preferably utilizes, as the above-mentioned cause of deterioration of fuel consumption, at least one of the followings; an amplitude, a variation rate, an extreme value and a correlation with respect to a predetermined pattern, as to the above-mentioned correction value.

The diagnostic apparatus for an internal combustion engine, according to the present invention preferably calculates the above-mentioned index of deterioration of fuel consumption from at least one of the followings; an accumulation value, an averaged value and a maximum value as to the above-mentioned cause of deterioration of fuel consumption within a predetermined time.

The diagnostic apparatus for an internal combustion engine, according to the present invention, preferably records the index of deterioration of fuel consumption in the recording device, in relation to the controlled correction value.

The diagnostic apparatus for an internal combustion engine, according to the present invention preferably sets the above-mentioned diagnostic threshold value, being based upon a regulation value under fuel regulations.

The diagnostic apparatus for an internal combustion engine, according to the present invention preferably detects a sign of an abnormality of the internal combustion engine, being based upon log data of the index of deterioration of fuel consumption recorded in the recording device.

The diagnostic apparatus for an internal combustion engine, according to the present invention preferably computes an instantaneous fuel consumption from a fuel injection pulse signal or the like in the internal combustion engine, and the abnormality diagnosing means determines an abnormality of the internal combustion engine, being based upon the instantaneous fuel consumption and the index of deterioration of fuel consumption.

The diagnostic apparatus for an internal combustion engine, according to the present invention, preferably records the instantaneous fuel consumption and the index of deterioration of fuel consumption in the recording device, then predicts a fuel consumption, being based upon a relationship between the recorded instantaneous fuel consumption and index of deterioration of fuel consumption, and informs the driver or an appliance external of a vehicle, the thus predicted fuel consumption.

The diagnostic apparatus for an internal combustion engine, according to the present invention, preferably issues a warning to the driver, and notifies abnormality information to an appliance external of a vehicle when the abnormality diagnostic means determines an abnormality of the internal combustion engine.

The diagnostic apparatus for an internal combustion engine, according to the present invention, preferably carries out a recovery process from an abnormality in order to recover the internal combustion engine from the abnormality when the index of deterioration of fuel consumption approaches the diagnostic threshold value.

With the diagnostic apparatus for an internal combustion engine according to the present invention, an abnormality of an internal combustion engine which causes deterioration of fuel consumption can soon be detected, thereby it is possible to prevent a vehicle from running in a condition of deteriorated fuel consumption. Further, a sign of an abnormality of an internal combustion engine can be detected, thereby it is possible to carry out an appropriate countermeasure (maintenance) before occurrence of a failure caused by a deterioration or an abnormality.

Detailed explanation will be hereinbelow made of embodiments of the diagnostic apparatus for an internal combustion engine, according to the present invention with reference to the accompanying drawings in which:

DETAILED EXPLANATION OF PREFERRED EMBODIMENTS

Figure 1:
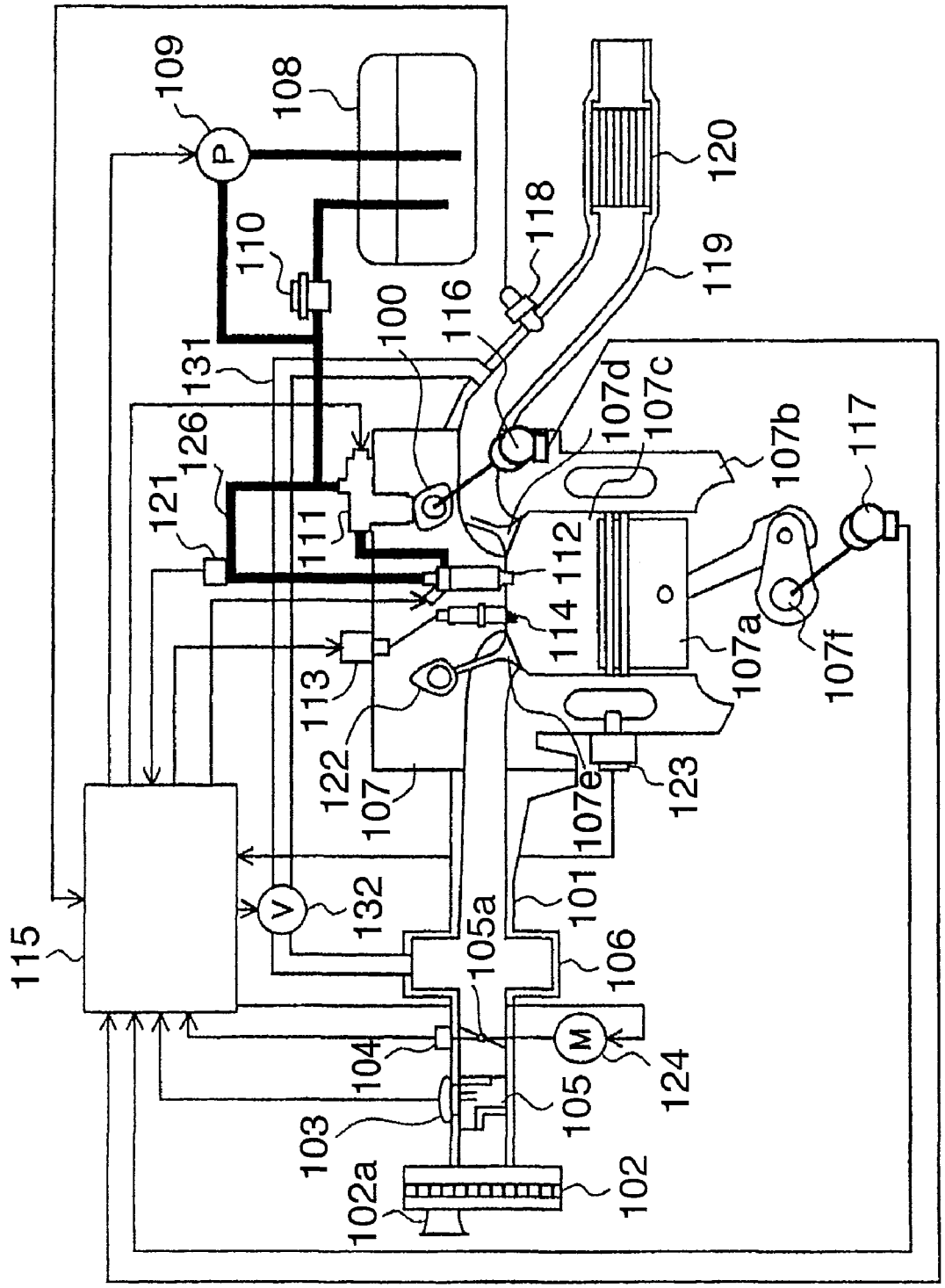
FIG. 1 is a view for illustrating an entire configuration of a cylinder injection type internal combustion engine in which a diagnostic apparatus according to the present invention is applied.

FIG. 1 shows an entire configuration of a cylinder injection type internal combustion engine in which the diagnostic apparatus according to the present invention is applied.

The engine (internal combustion engine) 107 has a cylinder block 107b and a plurality of pistons 107a. These block 107b and pistons 107a define a plurality of combustion chambers 107c.

An intake air which will be introduced in the combustion chambers 107c is led into an inlet part 102a of an air cleaner 102, and it then led through an air-flow meter (air-flow sensor) 103 as one of a plurality of operating condition measuring means in the internal combustion engine, and thereafter through an throttle body 105 in which an electrically controlled throttle valve 105a is accommodated, and into a collector 106. The electrically controlled throttle valve 105a is driven by an electric motor 124 so that an opening degree of the value is set.

An air-flow sensor 103 delivers a signal indicating a flow rate of the intake air to a control unit 115 which is a control device for the internal combustion engine. Attached to the throttle body 105 is a throttle sensor 104 for detecting an opening degree of the electronically controlled throttle valve 105a, as one of the operating condition measuring means in the internal combustion engine. The throttle sensor 104 delivers a signal indicating an opening degree of the electrically controlled throttle valve 105a to the control unit 115. Attached to the cylinder block 107b is a water temperature sensor 123 which delivers a signal indicating a temperature of cooling water in the engine 107, to the control unit 115.

The air sucked into the collector 106 is distributed and fed into the combustion chambers 107c by way of an intake air pipe 101 connected to the cylinder block 107b.

A fuel such as gasoline or the like from a fuel tank 108, which is primarily pressurized by a fuel pump 109, is regulated to a predetermined pressure by a fuel pressure regulator 110, and is then fed under pressure into a common line 126 after it is secondarily pressurized to a high pressure by a high pressure fuel pump 111. Each combustion chamber 107c has a corresponding injector 112. The high pressure fuel is directly injected into each combustion chamber 107c by way of corresponding injectors 112. The injectors 112 are applied thereto with fuel injection pulse signals so as to carry out fuel injection by fuel quantities in accordance with pulse widths of the fuel injection pulse signals.

The common line 126 is attached thereto with a fuel pressure sensor 121 for detecting a pressure of the high pressure fuel. The fuel pressure sensor 121 delivers a signal indicating a pressure of the high pressure fuel to the control unit 115.

The cylinder block 107b is attached thereto with spark plugs 114 for the respective fuel combustion chambers 107c. The fuel injected into the combustion chambers 107c is ignited by the spark plugs 114 which are applied thereto with ignition signals whose voltages are heightened by an ignition coil 113.

A cam angle sensor 116 is attached to a cam shaft 100 of an exhaust valve 107d. The cam angle sensor 116 delivers a signal for detecting a phase of the cam shaft 100, to the control unit 115. It is noted here that the cam angle sensor 116 may also be attached to a cam shaft 122 on the intake valve 107e side. Further, a crank angle sensor 117 is attached to the crank shaft 107f, for detecting a rotational speed and a phase of the crank shaft 107f in the engine 107. The crank angle sensor 117 delivers signals indicating a rotational speed and a phase of the crank shaft 107f to the control unit 115.

A ternary catalyst 120 is provided in an exhaust pipe 119, and a linear air-fuel ratio sensor 118 is provide upstream of the ternary catalyst 120. The linear air-fuel ratio sensor 118 is adapted to detect an existence of the oxygen in exhaust gas, and to deliver a detection signal thereof to the control unit 115.

The engine 107 is provided with an exhaust gas recirculation (EGR) passage 131 for communicating and connecting the exhaust pipe 119 to the collector 106. An exhaust recirculation valve (which will be hereinbelow referred to as "EGR valve") 132 is connected in the EGR passage 131. The EGR 132 is motor-driven, and is adapted to quantitatively control the EGR quantity in accordance with a valve opening degree.

The control unit 115 is electronically controlled by a microcomputer, for controlling the fuel injection quantity, the air-fuel ratio, the ignition timing and the EGR flow rate.

It is noted here that although explanation has been made of the cylinder injection type internal combustion engine, the present invention should not be limited to the engine of this type, but the present invention can be also applied to a port injection type internal combustion engine in which an injector 112 is attached to an intake port of the engine.

Figure 2:
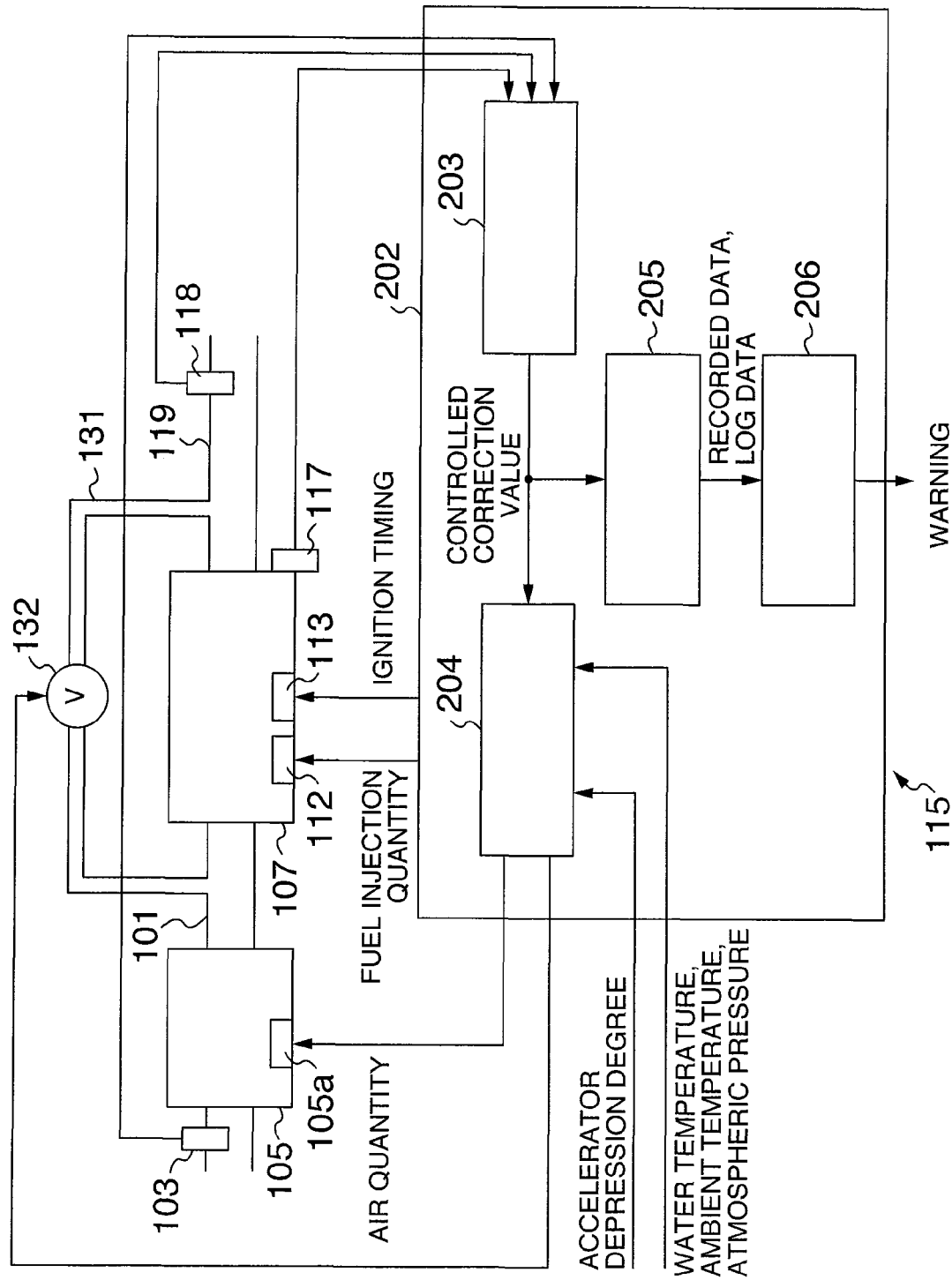
FIG. 2 is a block diagram illustrating an embodiment of the diagnostic apparatus according to the present invention.

Next, explanation will be hereinbelow made of an embodiment of the diagnostic apparatus for an internal combustion engine, according to the present invention, with reference to FIG. 2.

The control unit 115 is electronically controlled by a microcomputer, and executes a control program so as to embody a correction means 203, an adjusting means 204 and a diagnostic means 206.

The correction means 203 computes controlled correction values for a throttle opening degree, a fuel injection pulse width, a fuel injection timing, an ignition timing and an exhaust recirculation quantity, from values delivered from an air-flow sensor 103 provided upstream of the throttle valve, the crank angle sensor 117 attached to the internal combustion engine 107, and the air-fuel ratio sensor 118 attached to the exhaust pipe 119.

The adjusting means 204 delivers control signals for adjusting (setting) a fuel injection quantity (fuel injection pulse width), a fuel injection timing, an ignition timing, an air quantity (throttle opening degree) and an EGR valve opening degree, which are computed from an accelerator pedal depression degree (accelerator opening degree), the controlled correction values computed by the correction means 203, and operation environmental values including a water temperature, an ambient temperature, and an atmospheric pressure, to the injectors 112, the ignition coil 113, the electrically controlled throttle valve 105a and the EGR valve 132. Thus, the combustion of the engine 107 is controlled.

The control unit 115 includes a recording device 205 composed of a non-volatile memory such as a non-volatile RAM. The recording device 205 records (stores) therein the controlled correction values (correction values for the fuel injection quantity, an air-fuel ratio correcting factor, an ignition retard value and an EGR value) computed by the correction means 203 at every predetermined time as log information.

The diagnostic means 206 is adapted to diagnose a deterioration of fuel consumption caused by aging of the engine 107, evaluates the fuel consumption with the use of data and logs thereof recorded in the recoding device 205 in order to detect an abnormality (a degree of deterioration) of the internal combustion engine.

Figure 3:
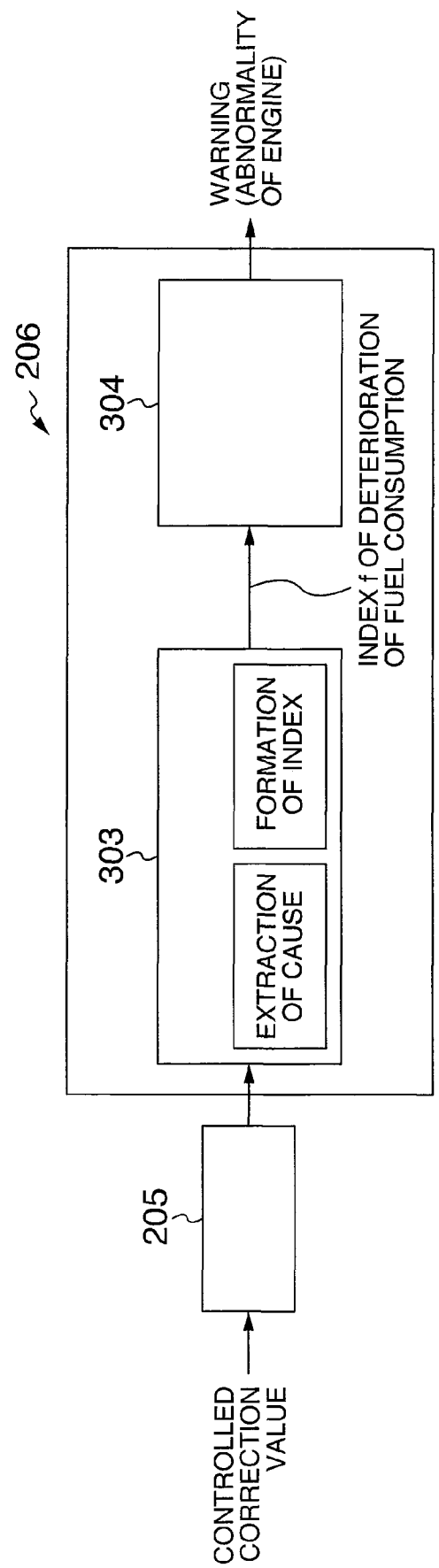
FIG. 3 is a block diagram illustrating an embodiment of the diagnostic apparatus, in detail, according to the present invention.

An example of the diagnostic means 206 will be explained in detail with reference to FIG. 3. The diagnostic means 206 comprises a fuel consumption evaluation portion 303 and an abnormality diagnostic portion 304.

The fuel consumption evaluation portion 303 extracts a factor (or cause) of deterioration of fuel consumption, being based upon recording data, that is, the controlled correction values including the correction value for the fuel injection quantity, the air fuel-ratio correction factor, the ignition retard value and the EGR quantity, and the log data thereof, which are recorded in the recording device 205, and calculates an index f of deterioration of fuel consumption.

It is noted here that the factor of deterioration of fuel consumption relates to the deterioration of fuel consumption which is determined by extracting values as to the controlled correction values and the log data. How to pick up or extract this factor from the above data etc. is for example, to use an averaged value, an extreme value, an amplitude, a frequency or a correlation with a predetermined reference pattern.

The index f of deterioration of fuel consumption indicates a synthesis of a plurality of existing factors of deterioration of fuel consumption, as a single index. To determine the index f, linear summation, a Maharanobi's generalized distance, a neural network or the like can be used. The index f of deterioration of fuel consumption is calculated form at least one of the following values: an accumulation value, an averaged value and a maximum value of a cause of deterioration of fuel consumption in a predetermined time. Thus, it is possible to precisely and quickly detect a deterioration of fuel consumption caused by an abnormality of the engine.

Figure 4:
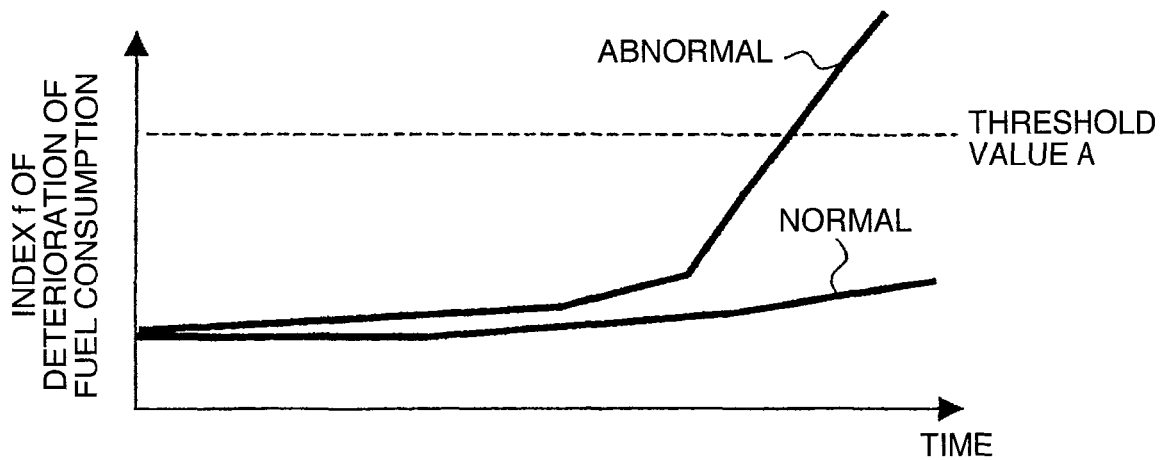
FIG. 4 is a time chart for an index of deterioration of fuel consumption.

The abnormality diagnostic portion 304 determines an abnormality of the internal combustion engine when the index f of deterioration of fuel consumption exceeds an abnormality determination threshold value (diagnostic threshold value) A which is set with respect to the index f of deterioration of fuel consumption as shown in FIG. 4, and notifies a warning as to occurrence of an abnormality of the internal combustion engine.

Next, detailed explanation will be hereinbelow made of the content of the present invention with reference to the diagnostic apparatus for an internal combustion engine with the use of an ignition timing as a simple example.

Figure 5:
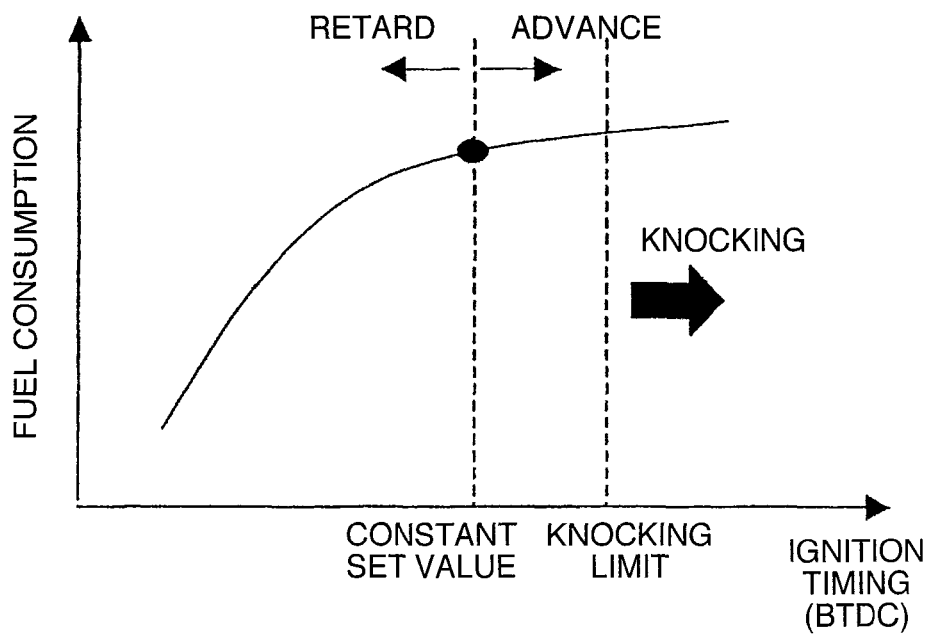
FIG. 5 is a graph showing a relationship between ignition timing and fuel consumption.

FIG. 5 is a graph showing a relationship between the ignition timing and the fuel consumption. Normally, the ignition timing is controlled to a predetermined value (constant set value) which has been previously set in accordance with a rotational speed and a load of the engine. Should the ignition timing be greatly advanced from the constant set value, knocking would occur. However, in order to enhance the fuel consumption, the following knocking control is carried out: the ignition timing is advanced up to the knocking limit, and in the case of detection of knocking, knocking control for retarding the ignition timing is carried out.

Further, in the retarding direction, for example, torque control is carried out in such a way that the ignition timing is retarded in order to restrain vibration upon acceleration so as to decrease the torque.

With the above-mentioned control, the ignition timing is corrected for advance or retardation with respect to a predetermined constant set value. Since the retardation of the ignition timing (ignition retard) possibly causes deterioration of fuel consumption, the retard value is recorded and evaluated so as to detect an abnormality of the engine which causes deterioration of fuel consumption.

Figure 6:
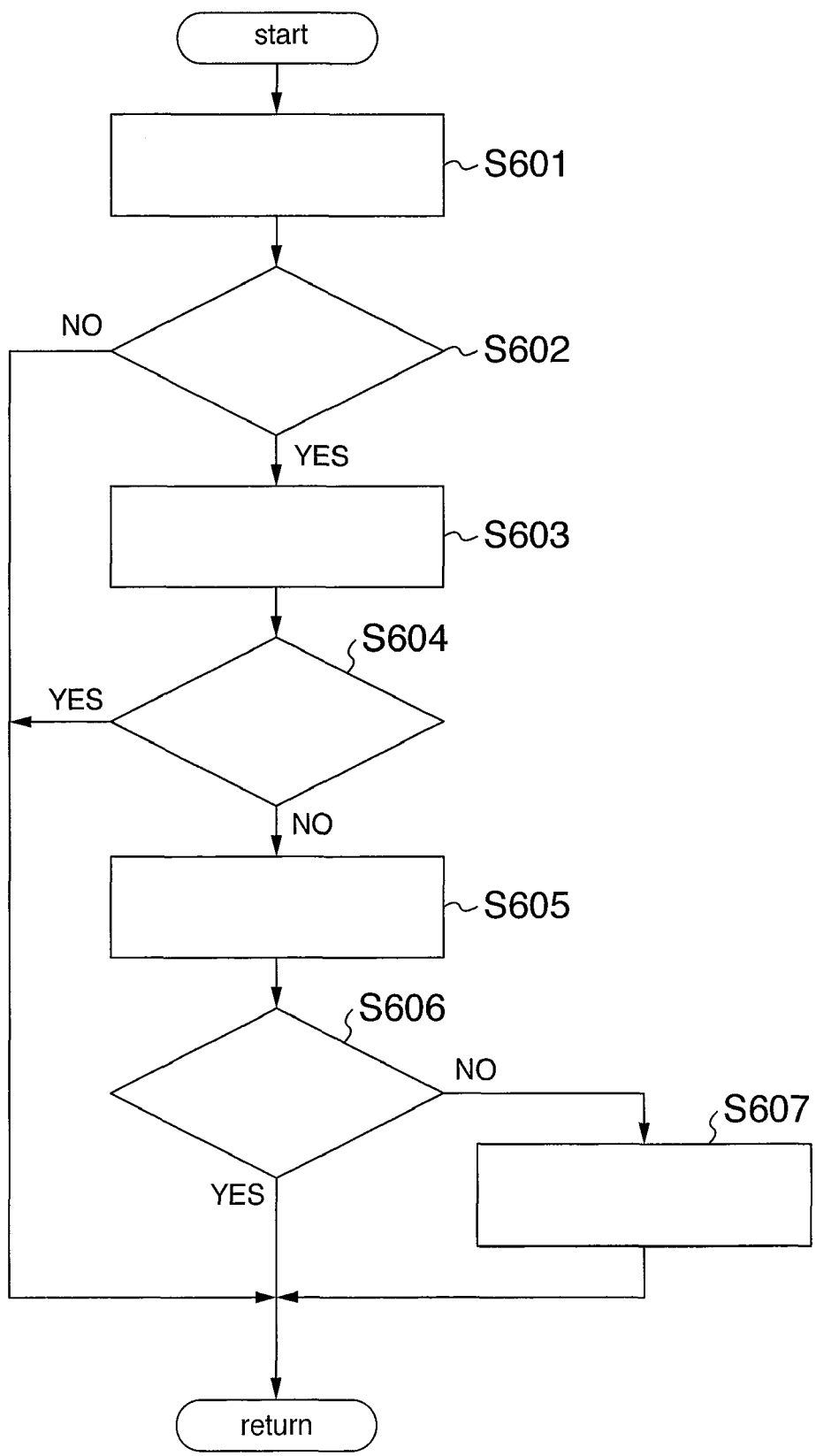
FIG. 6 is a flow chart illustrating an example of a fuel consumption diagnosis routine, being based upon a retardation value of ignition timing.

FIG. 6 is a flow chart which shows a fuel consumption diagnosis routine based upon a retardation value of the ignition timing. This routine is repeated at every, for example, 10 ms.

At first, at step S601, a correction value of the ignition timing (ignition retard value) is recorded in the recording device 205 as log information.

Next, at step S602, whether a fuel consumption diagnosis term is satisfied or not is determined. If it is not satisfied, this routine is ended without carrying out the following process steps. Where, as to the fuel consumption diagnosis term, there may be used at least one of the following terms: whether a predetermined time elapses from the previous diagnosis or not, whether an operating zone (a water temperature, a rotation speed, an accelerator opening degree, a speed or the like) falls in a predetermined range or not, whether another abnormality is detected or not and whether a demand of diagnosis is inputted from the outside of the vehicle or not.

If the starting term of the fuel consumption diagnosis is satisfied, at step 603, the index f of deterioration of fuel consumption is calculated, and is recorded, in relation to a correction value of the ignition timing which has been used for calculation of the index f of deterioration of fuel consumption. As to the relating method, a range of log data of the correction value simply used for the calculation may be recorded, or the data used for the calculation may be also recorded together as packed data.

Thus, by recording the index f of deterioration of fuel consumption and the controlled correction value (the correction value of the ignition timing) in relation to each other, trouble shooting for an abnormality can be facilitated during maintenance work. Further, with the data packing on data compression, the amount of the diagnosis data for communication with an appliance external of the vehicle can be reduced. Thus, the communication load can be reduced.

As the method of calculating the index f of deterioration of fuel consumption, if the ignition retard values are accumulated, step S604 will be carried out. In the step S604, whether the index f of deterioration of fuel consumption which is the accumulation value of the ignition retard values over a predetermined time, approaches the diagnostic threshold value A which has been previously determined being based upon an exhaust regulation value or not is determined. If Index f of Deterioration of Fuel Consumption−Predetermined Value<Diagnostic Threshold Value A is not satisfied, that is, if the index f of deterioration of fuel consumption approaches the diagnostic threshold value A which has been previously set being based upon the exhaust regulation value, then at step 605, a recovery process from an abnormality is carried out.

As to the recovery process from an abnormality, in order to clear off deposits in the engine, at least one of control processes including advancing the ignition timing, controlling the intake and exhaust valves so as to confine exhaust gas, and increasing the idle speed is carried out.

Thus, when the index f of deterioration of fuel consumption approaches the diagnostic threshold value A as stated above, the recovery process from an abnormality is carried out so as to prevent or delay occurrence of an abnormality, thereby it is possible to prevent a vehicle from running in a situation of deteriorated fuel consumption.

Next, at step S606, whether the accumulation value (the index f of deterioration of fuel consumption) of the ignition retard values over a predetermined time is smaller than the predetermined threshold value A which has been previously set being based upon an exhaust regulation value or not is determined. If Index f of Deterioration of Fuel Consumption<Diagnostic Threshold Value A, the engine is determined as normal, and then this routine is ended.

On the contrary, irrespective of carrying out the recovery process from an abnormality, if the formula Index f of Deterioration of Fuel Consumption<Predetermined Value A is not satisfied, the engine is determined to be abnormal, then step S607 is carried out. It is noted that the diagnostic threshold value A is determined under regulations or the like in any of countries so that the regulation of fuel consumption in any of several counties can be satisfied.

If an abnormality is determined, at step S607, an abnormality of the internal combustion engine is notified, and further, is recorded in the recording device 205. It is noted here that in addition to the notification of the abnormality to the driver, it can be transmitted through wireless communication to an appliance external of the vehicle, and accordingly, any countermeasure (for example, a maintenance) can be taken rapidly. For example, with the information of abnormality to the dealer, the preparation for a repair can be made before the vehicle comes to the dealer, thereby it is possible to shorten the time for which the driver should wait due to the repair of the vehicle.

Thus, with the communication to the appliance external of the vehicle, the third party can precisely grasp an abnormal condition, thereby it is possible to carry out the maintenance with an appropriate timing.

Further, upon occurrence of an abnormality, not only the controlled correction value but also engine data (detected values from various sensors and control values at that times when the former values are inputted to the control unit 115) are recorded in relation to the index f of deterioration of fuel consumption, and accordingly, the dealer can rapidly specify a cause of the abnormality. Further, by the transmission of the above-mentioned compressed recording data through communication to the dealer, the diagnosis can be carried out at a remote location.

Figure 7A:
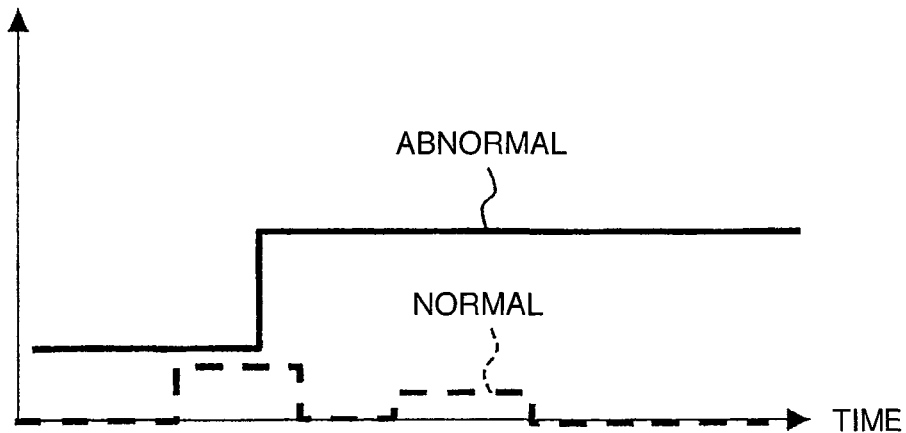
FIGS. 7A to 7C are time charts as to an ignition retard value, an index of deterioration of fuel consumption and an engine abnormality flag in the case of carrying out the fuel consumption diagnosis routine based upon the retard value of an ignition timing.
Figure 7B:
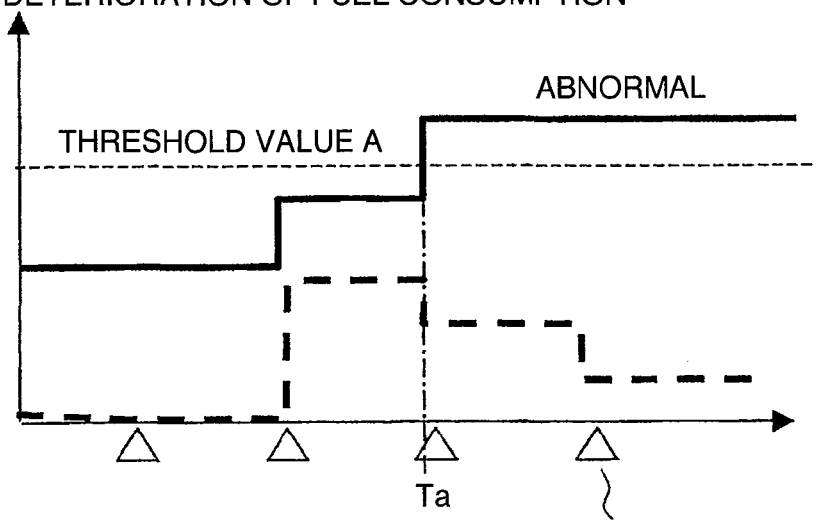
Figure 7C:
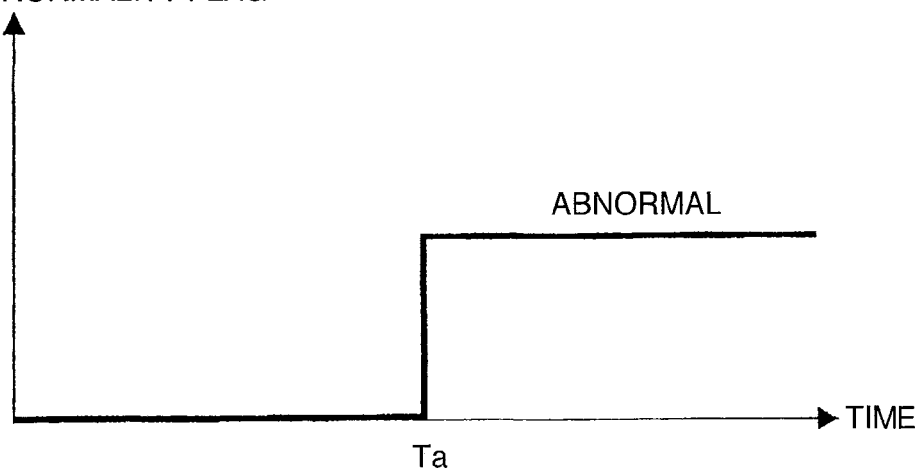

FIGS. 7A to 7C show an example of time charts when the present fuel consumption diagnosis routine is carried out.

If an abnormality occurs in the internal combustion engine, the ignition retard value will be greater than a normal value. In an exemplification, if knocking is likely to occur, the ignition retard value will be greater. Accordingly, the index f of deterioration of fuel consumption (the accumulation value of ignition retard values in this case) will be greater upon occurrence of an abnormality, and it is determined to be abnormal at once the index f of deterioration of fuel consumption exceeds a the threshold value A (time point Ta), and an engine abnormality flag is set up.

It is noted that although the abnormality is determined at once the index f of deterioration of fuel consumption exceeds the threshold value A, the engine abnormality flag may be also set up only when the number of successive times at which the index f of deterioration of fuel consumption exceeds the threshold value A or a frequency of exceeding the threshold value A exceeds a predetermined value, thereby it is possible to further enhance the reliability of the diagnosis. Further, by recording the abnormality flag information and the above-mentioned engine data when the abnormality is determined, and transmitting them through wireless communication, to an appliance external of the vehicle, a more appropriate maintenance can be indeed made.

Figure 8A:
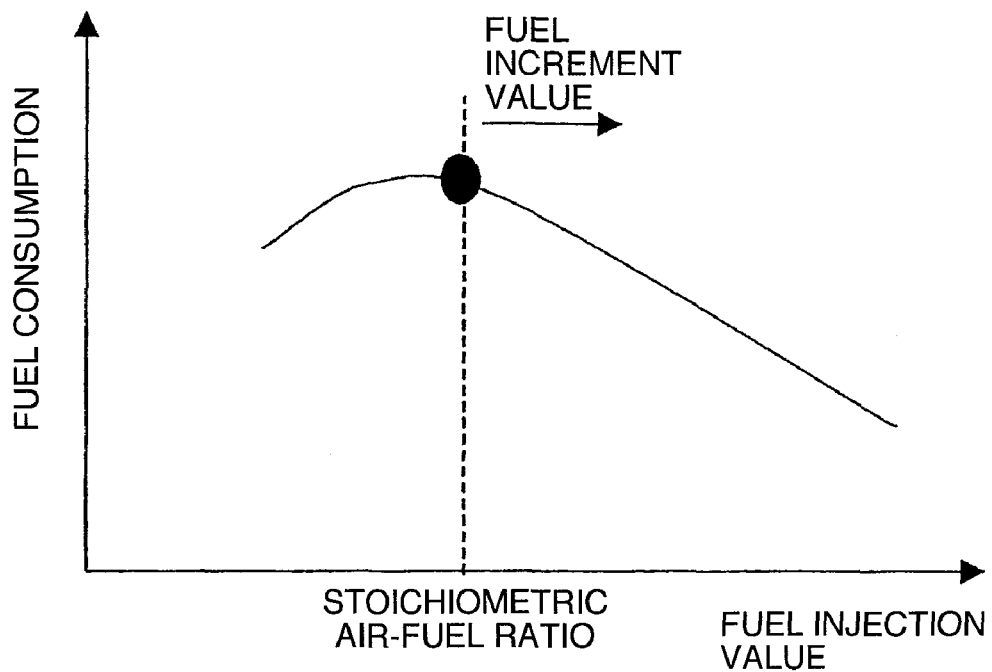
FIG. 8A is a graph showing a relationship between a fuel injection quantity and a fuel consumption.
Figure 8B:
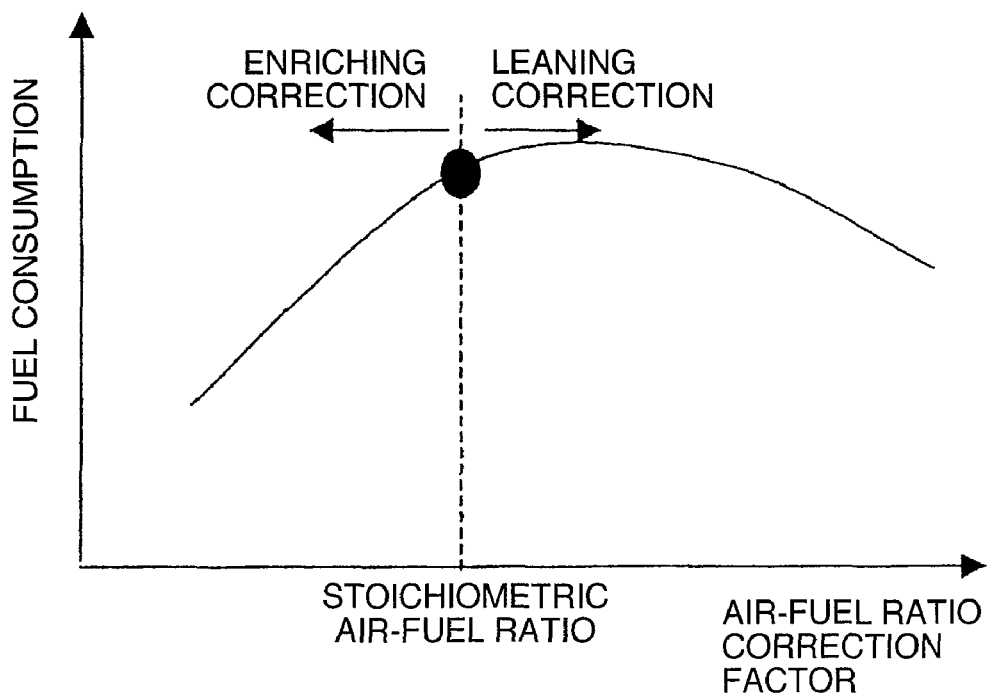
FIG. 8B is a graph showing a relationship between an air-fuel ratio correction factor and a fuel consumption.

Further, as shown in FIGS. 8A and 8B, the correction value for a fuel injection quantity and the air-fuel ratio correction factor are also the controlled correction values for the engine, which affect upon the fuel consumption. A stoichiometric air-fuel ratio is the one with which the air and the fuel can be completely burnt in the combustion chamber, and accordingly, should the fuel be injected so as to exceed the stoichiometric air-fuel ratio, unburnt fuel would remain, causing deterioration of fuel consumption. It is similar, in view of the air-fuel ratio correction factor. For exhaustion, although the air-fuel ratio feed-back control is carried out, the part of the control corresponding to a correction for enriching the air-fuel ratio is useless in view of the fuel consumption without effecting any toque, causing a deterioration of fuel consumption. Alternatively, if a correction for leaning the air-fuel ratio is carried out, the torque is decreased causing a stepwise toque difference with respect to another cylinder, thus, it also causes a deterioration of fuel consumption. In addition, an excessive EGR quantity also deteriorates the fuel combustion, and accordingly, may also cause a deterioration of fuel consumption.

By calculating the index of deterioration of fuel consumption by using at least one of the above-mentioned causes of deterioration of fuel consumption, the fuel consumption can be evaluated and an abnormality of the internal combustion engine can be rapidly detected.

It is noted here that if a plurality of causes of deterioration of fuel consumption are independent from one another, linear summation thereof may be taken, but if they are not independent from one another, the summation of a first main component to N-th main component upon analysis of main components may also be taken. Further, a Maharonobis' generalized distance or a neural network may be also computed in reference to causes of deterioration of fuel consumption during normal operation.

Figure 9:
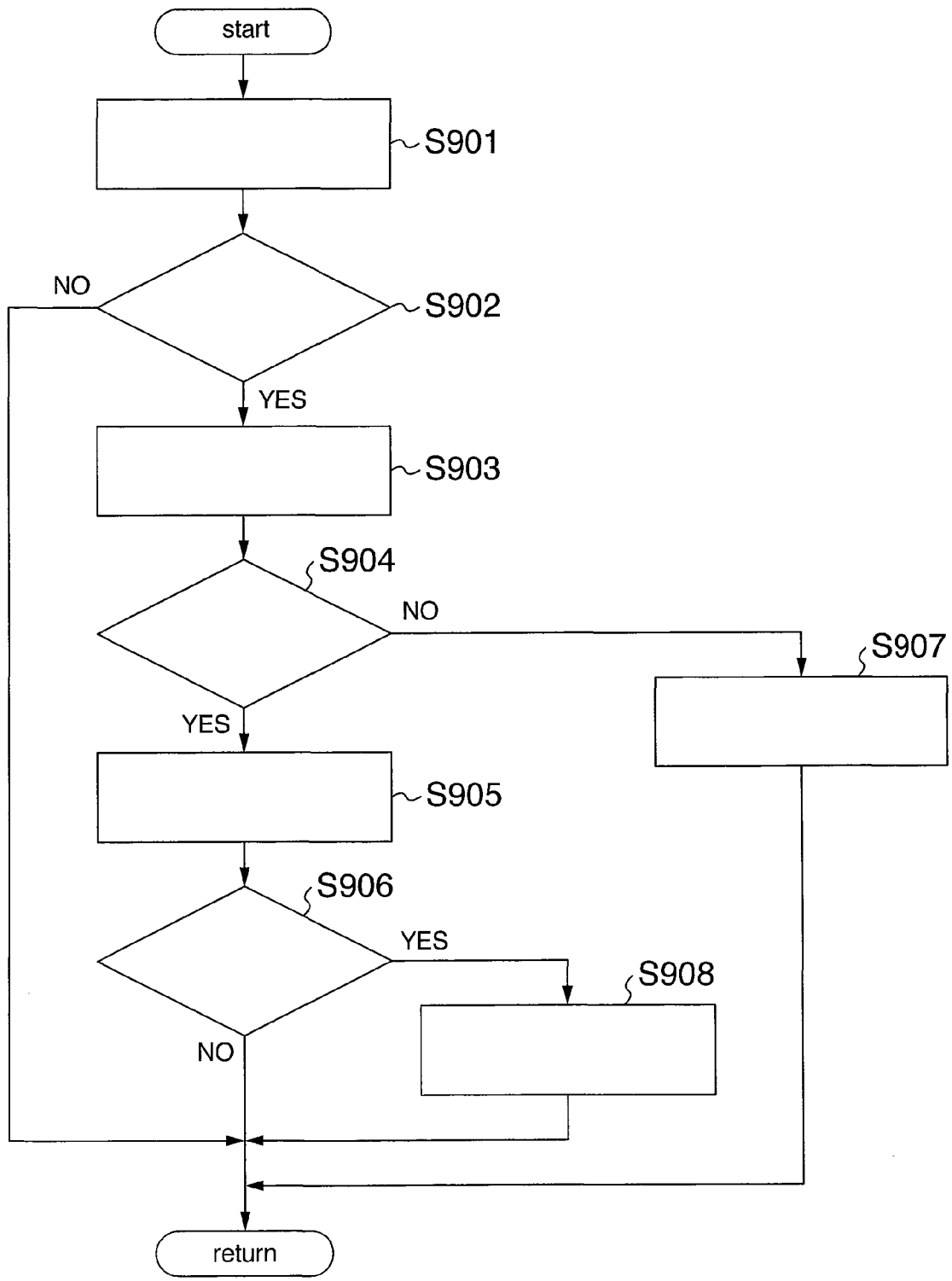
FIG. 9 is a flow chart illustrating another example of the fuel consumption diagnosis routine.

FIG. 9 is a flow chart which shows another example of the fuel consumption diagnosis routine. In this fuel consumption diagnosis routine, an abnormality of an internal combustion engine is predicted. This routine is also repeated at every, for example, 10 msec.

At first, at step S901, a controlled correction value(s) such as an ignition retard value, an air-fuel ratio correction factor or a fuel increment value is recorded as log data in the recording device 205.

Next, at step S902, whether the term of fuel consumption diagnosis is satisfied or not is determined. If it is not satisfied, this routine is ended.

If the term of fuel consumption diagnosis is satisfied, at step S903, the index f of deterioration of fuel consumption is calculated, the result of the calculation is recorded in the recording device 205 in time series.

Next, at step S904, whether the index f of deterioration of fuel consumption is smaller than the diagnostic threshold value or not is determined. If it is smaller, step S905 is carried out, but it is false, step 907 is carried out.

It is noted here that in the case of carrying out step S907, since the fuel consumption is deteriorated due to an abnormality of the internal combustion engine, and accordingly, it is notified to the driver and an appliance external of the vehicle, and such abnormal information is recorded in the recoding device 205 in relation to the controlled correction value. Thereafter, this routine is ended.

At step S905, that is, if the formula: Index f of Deterioration of Fuel Consumption<Diagnosis Threshold Value A is not satisfied, the speed of progress of deterioration is evaluated being based upon the log data of the index f of deterioration of fuel consumption. In this case, for example, a difference from the previous index of deterioration of fuel consumption, or a difference from that on a previous day or in a previous month or a difference from that at the time of new car registration, is computed, and in comparison with the past data, the value of the speed of progress of deterioration is calculated. It is noted that a pattern matching may be used for the calculation of the speed of progress of deterioration. Further, the speed of progress of deterioration may be calculated with the use of an neural network, a correlation analysis, a Maharobis' generalized distance or the like with reference to a normal speed of progress of deterioration.

Next, at step S906, a sign of an abnormality is detected being based upon the speed of progress of deterioration and the index of deterioration of fuel consumption. If the sign of an abnormality is present, step S908 is carried out, but otherwise, this routine is ended.

The determination of the sign of an abnormality is carried out being based upon a variation in the speed of progress of deterioration and the index of deterioration of fuel consumption at that time. For example, even though the index of deterioration of fuel consumption is small, it may be possibly determined that a sign of an abnormality is present if the speed of progress of deterioration is large.

At step S908, the sign of an abnormality of the internal combustion engine is notified to the driver or an appliance external of the vehicle, and the condition at that time is stored in the recording device 205.

Thus, with the use of the log data as to the index of deterioration of fuel consumption, pre-diagnosis of a sign of an abnormality can be carried out before the abnormality causes a deterioration of fuel consumption, and further, even if it is predicted that the speed of progress of deterioration is further increased so that a failure will soon occurs, it is possible to carry out appropriate maintenance beforehand.

Further, the time when a failure occurs in case that no maintenance will not be performed can be predicted, and accordingly, the failure can be prevented from occurring beforehand, and a maintenance can be carried out with an appropriate timing.

Figure 10:
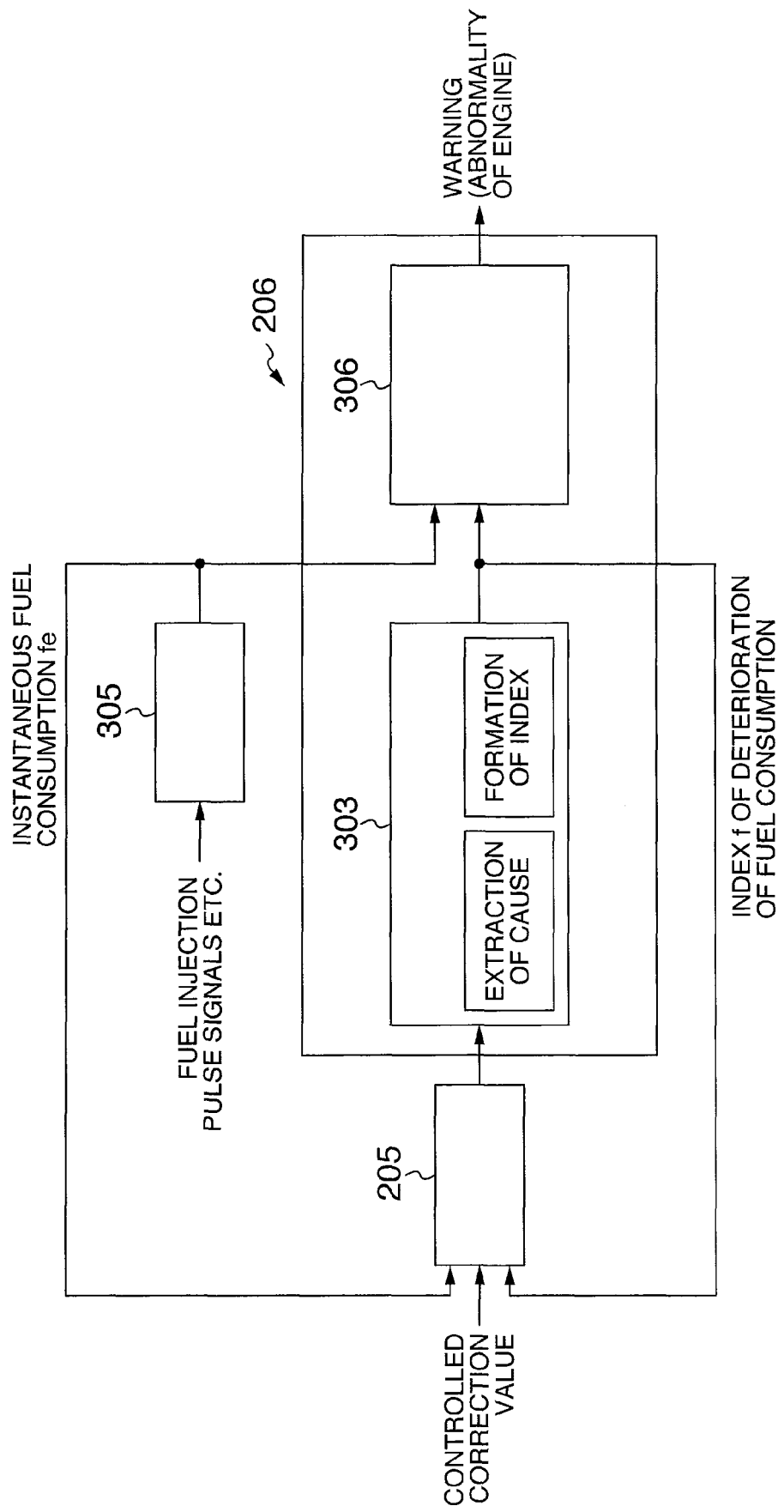
FIG. 10 is a block diagram illustrating another embodiment of the diagnostic apparatus according to the present invention.

FIG. 10 shows another embodiment of the diagnostic means 206 in detail. This diagnostic means 206 is composed of a fuel consumption evaluation portion 303 and an abnormality diagnostic portion 306.

In this embodiment, the abnormality diagnostic portion 306 receives an instantaneous fuel consumption computed by a fuel consumption computing portion 303 for computing a fuel instantaneous fuel consumption from a fuel injection pulse signal or the like, in addition to the index f of deterioration of fuel consumption delivered from the fuel consumption evaluation portion 303, and therefore carries out a diagnosis for an abnormality. It is noted that the instantaneous fuel consumption fe computed by the fuel consumption computing portion 305 is also recorded as log data in the recording device 205.

Figure 11:
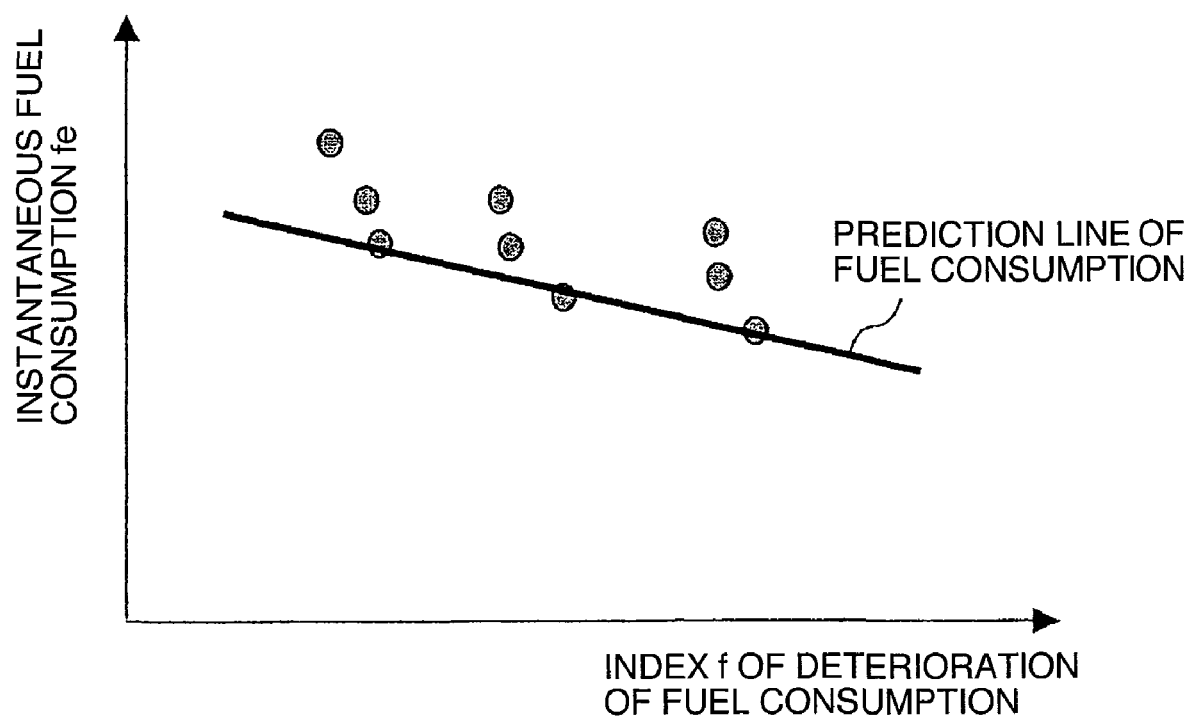
FIG. 11 is a graph indicating a relationship between an index of deterioration of fuel consumption and an instantaneous fuel consumption.

With the above-mentioned configuration, the correlation between the index f of deterioration of fuel consumption and the instantaneous fuel consumption fe can be learned. FIG. 11 shows an example of using a least square method as the above-mentioned learning method. Through function approximation with the use of the least square method, a prediction line of deterioration of fuel consumption can be drawn. Thereby it is possible to estimate the instantaneous fuel consumption fe from the index f of deterioration of fuel consumption with the use of the prediction line of deterioration of fuel consumption.

Figure 12:
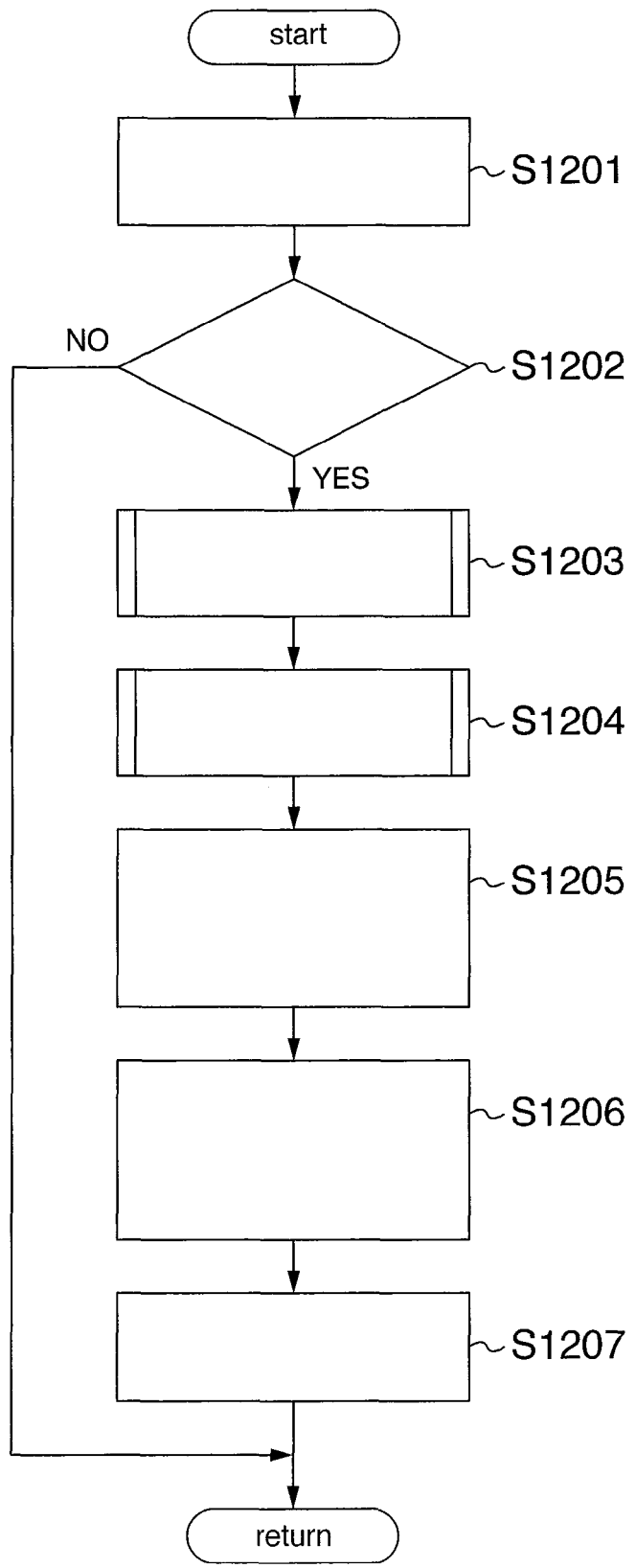
FIG. 12 is a flow chart showing an example of a routine for estimating an instantaneous fuel consumption in view of an index of deterioration of fuel consumption.

FIG. 12 is a flow chart which shows an example of a routine for estimating the instantaneous fuel consumption fe from the index f of deterioration of fuel consumption.

At first, at step S1201, controlled correction values (an ignition retard value, an EGR value, an air-fuel ratio correction factor, a fuel increment value and the like) are recorded as log data in the recording device 205.

Next, at step S1202, whether a term of fuel consumption diagnosis is satisfied or not is determined. If it is not satisfied, this routine is ended without carrying out the following process steps.

If the term of fuel consumption diagnosis is satisfied, step S1203 is carried out. At step S1203, abnormality diagnosis is carried out. It is in this case noted here that steps S903 to S908 in the routine shown in FIG. 9 can carried out.

Next, at step S1204, a fuel consumption computing process will be carried out. It is noted here that the instantaneous fuel consumption may be computed by accumulating fuel injection pulse widths and vehicle speeds.

Next, at step S1205, the index of deterioration of fuel consumption obtained by the abnormality diagnostic process and the instantaneous fuel consumption obtained by the fuel consumption computing process are recorded in the recording device 205 in relation to each other.

Next, at step S1206, the relationship between the index of deterioration of fuel consumption and the fuel consumption is learned in view of the instantaneous fuel consumption and the index of deterioration of fuel consumption which were related to each other. In this case, for example, a neural network may be used, or function approximation such as a spline function may be simply used.

Next, at steps 1207, a fuel consumption in future and a fuel consumption in a predetermined running pattern and the like are predicted being based upon the present predicted value in view of the recoded index of deterioration of fuel consumption, and the above-mentioned relationship, and the log data of the index of deterioration of fuel consumption, and the predicted fuel consumption value is displayed on a display unit such as a navigation screen.

Thus, the driver can grasp an abnormality of an internal combustion engine, a degree of deterioration thereof, and a sign thereof in a well-understandable form, and accordingly, the operator can easily determine the timing of sending the vehicle for its maintenance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A diagnostic apparatus for an internal combustion engine, comprising:
   an adjusting device for adjusting a burning condition,
   a correction device for estimating or detecting an input or an output to and from the internal combustion engine so as to correct at least one of a throttle opening degree, a fuel injection pulse width, a fuel injection timing, an ignition timing and an exhaust gas recirculation quantity,
   a recording device for recoding a controlled correction value from the correction device at every predetermined time, and
   a fuel consumption evaluation means for evaluating a fuel consumption of the internal combustion engine, being based upon the recorded data in the recording device or log data as to the recorded data.

2. A diagnostic apparatus for an internal combustion engine as set forth in claim 1, wherein the recording device records therein at least one of controlled correction values relating to the fuel combustion, such as a retard value of the ignition timing, a fuel increment value, an air-fuel ratio correction factor, and an opening degree of an exhaust gas recirculation valve.

3. A diagnostic apparatus for an internal combustion engine as set forth in claim 1, wherein a recovery process for recovery from an abnormality is carried out when the index of deterioration of fuel consumption approaches the diagnostic threshold value.

4. A diagnostic apparatus for an internal combustion engine as set forth in claim 1, further comprising an abnormality diagnostic means for determining an abnormality of the internal combustion engine, being based upon a fuel consumption of the internal combustion engine which has been evaluated by the fuel consumption evaluation means.

5. A diagnostic apparatus for an internal combustion engine as set forth in claim 4, wherein the fuel consumption evaluation means is adapted to extract a cause of deterioration of fuel consumption from the controlled correction value and to calculate an index of deterioration of fuel consumption being based upon the extracted cause of deterioration of fuel consumption, and the abnormality diagnostic means is adapted to determine an abnormality of the internal combustion engine when the index of deterioration of fuel consumption exceeds a predetermined diagnostic threshold value.

6. A diagnostic apparatus for an internal combustion engine as set forth in claim 5, wherein at least one of a value, an amplitude, a variation rate, an extreme value of the controlled correction value, and a correlation thereof to a predetermined pattern is used as the cause of deterioration of fuel consumption.

7. A diagnostic apparatus for an internal combustion engine as set forth in claim 5, wherein the index of deterioration of fuel consumption is calculated from at least one of a value, an accumulation value, an averaged value and a maximum value of the cause of deterioration of fuel consumption.

8. A diagnostic apparatus for an internal combustion engine as set forth in claim 5, wherein the index of deterioration of fuel consumption is recorded in the recording device in relation to the controlled correction value.

9. A diagnostic apparatus for an internal combustion engine as set forth in claim 5, wherein the diagnostic threshold value is set being based upon a regulation value under regulations of fuel consumption.

10. A diagnostic apparatus for an internal combustion engine as set forth in claim 5, wherein a sign of abnormality of the internal combustion engine is detected, being based upon log data recorded in the recording device as to the index of deterioration of fuel consumption.

11. A diagnostic apparatus for an internal combustion engine as set forth in claim 5, wherein an instantaneous fuel consumption is computed from fuel injection pulse signals or the like of the internal combustion engine, and the abnormality diagnostic means determines an abnormality of the internal combustion engine, being based upon the instantaneous fuel consumption and the index of deterioration of fuel consumption.

12. A diagnostic apparatus for an internal combustion engine as set forth in claim 5, wherein the instantaneous fuel combustion and the index of deterioration of fuel consumption are both recorded in the recording device, and a fuel consumption is predicted, being based upon a relationship between the instantaneous fuel consumption and the index of deterioration of fuel consumption which have been recorded in the recording device, and the predicted fuel consumption is notified to the deriver or an appliance external of a vehicle.

13. A diagnostic apparatus for an internal combustion engine, as set forth in claim 5, wherein a warning is issued to the driver when the abnormality diagnostic means determines an abnormality of the internal combustion engine, and abnormality information is notified to an appliance external of a vehicle.

* * * * *